May 31, 1949.   E. M. McELHINNEY   2,471,639
LOADING MACHINE
Filed Dec. 29, 1945   4 Sheets-Sheet 1
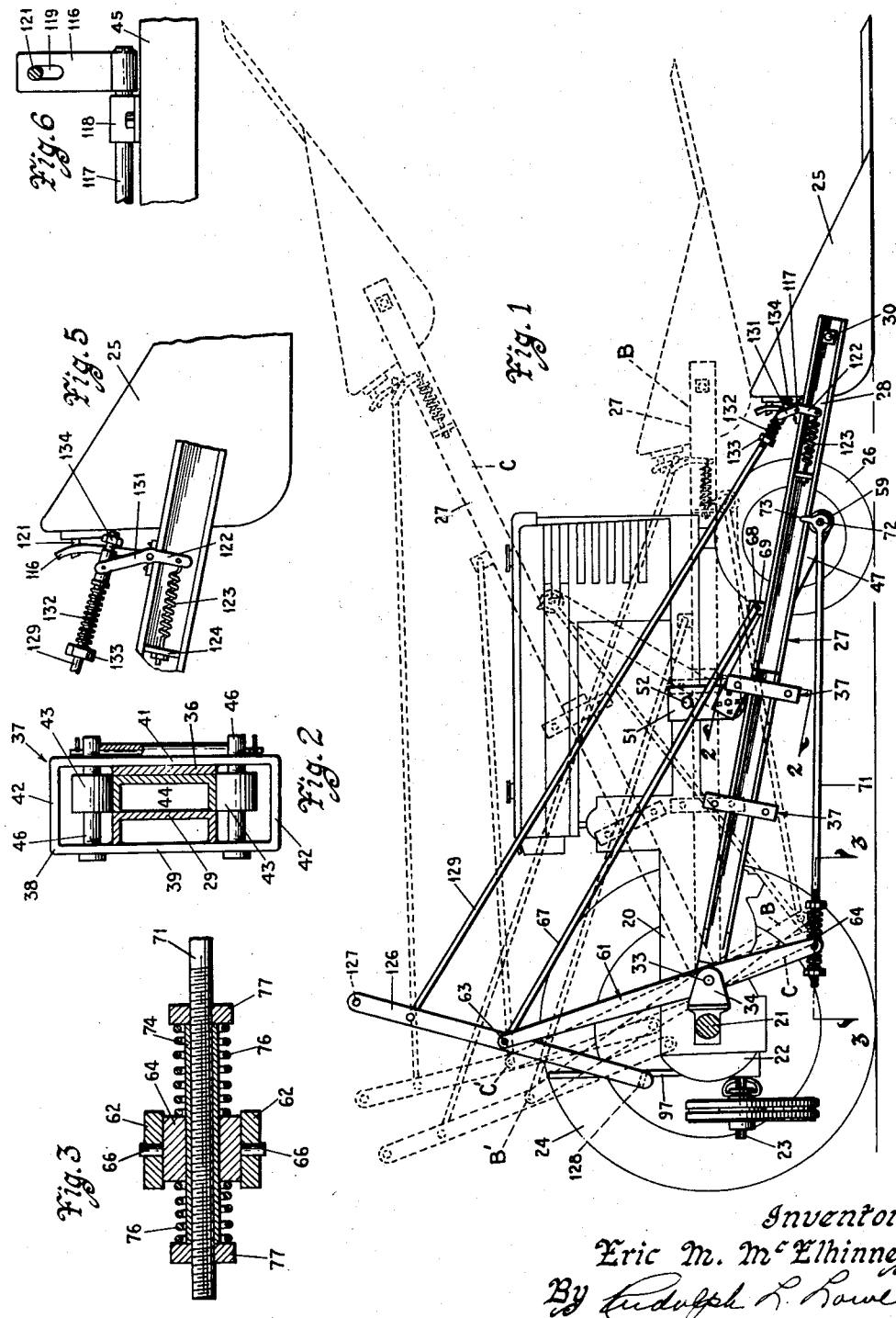
Inventor
Eric M. McElhinney
By Rudolph L. Lowell
Attorney

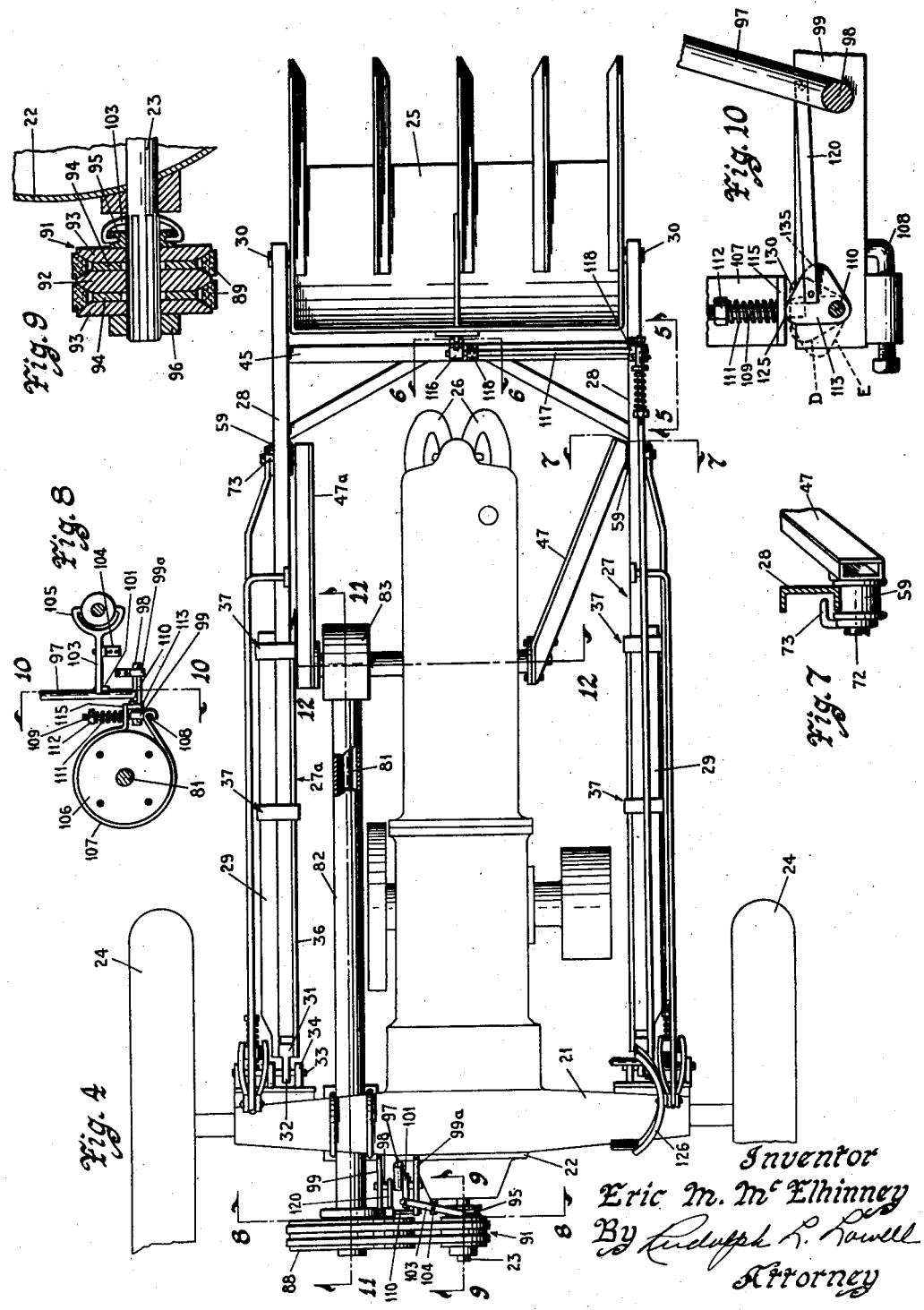

May 31, 1949.　　　　E. M. McELHINNEY　　　　2,471,639
LOADING MACHINE
Filed Dec. 29, 1945　　　　　　　　　　　　　　4 Sheets-Sheet 3
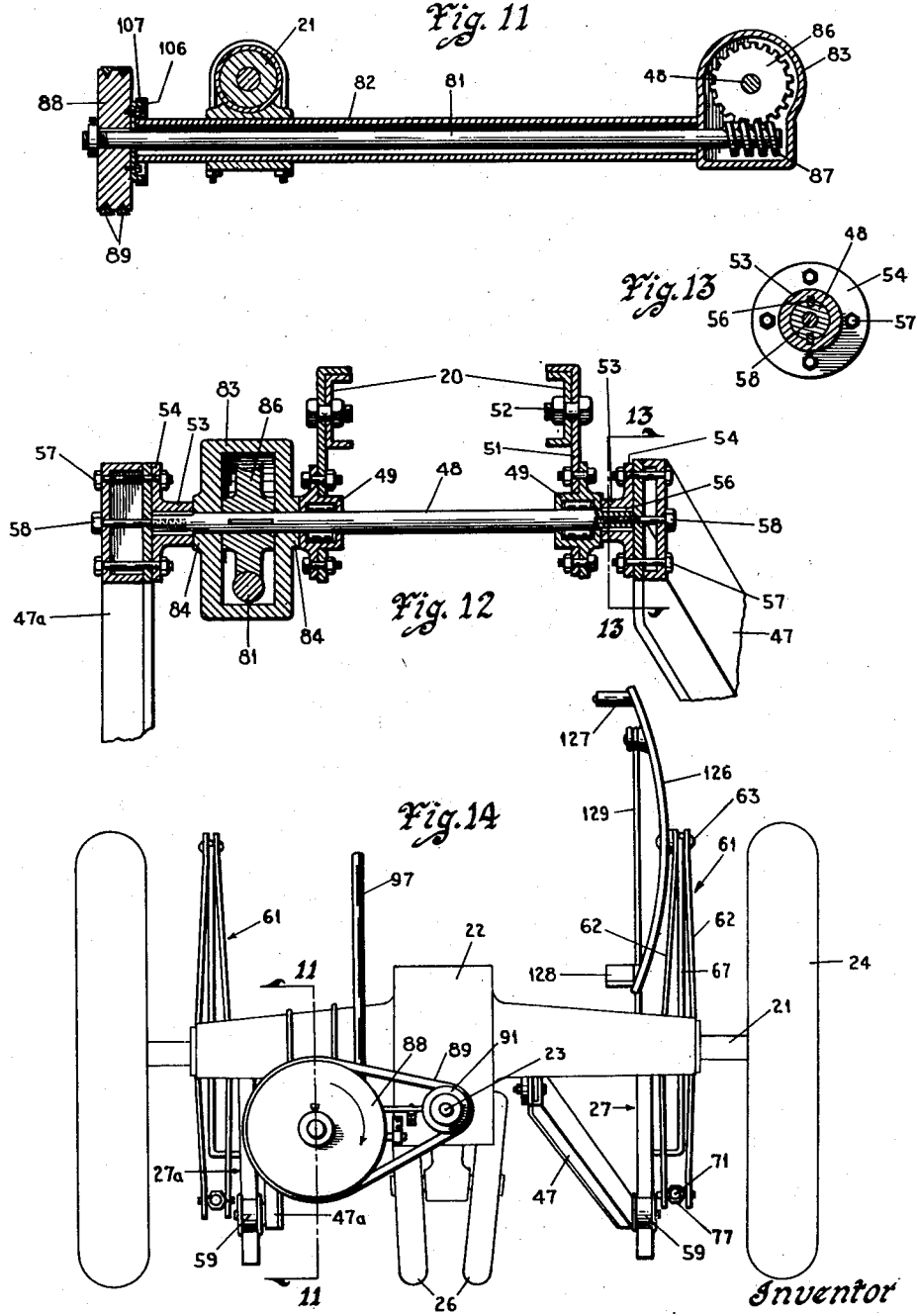

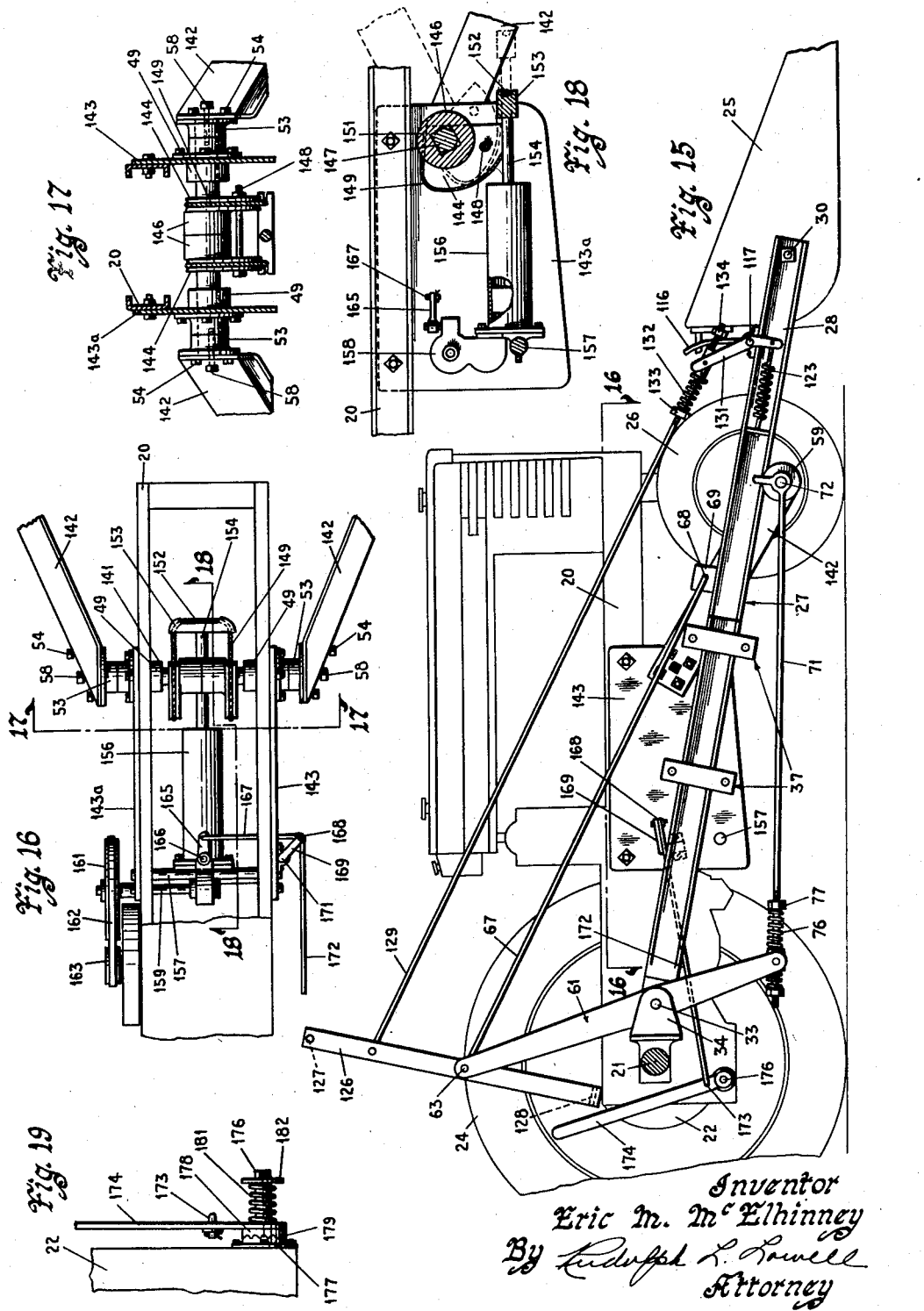

Patented May 31, 1949

2,471,639

UNITED STATES PATENT OFFICE 2,471,639

LOADING MACHINE

Eric M. McElhinney, Dysart, Iowa

Application December 29, 1945, Serial No. 637,921

11 Claims. (Cl. 214—141)

1

This invention relates generally to loading machines and in particular to a loader attachment for a tractor adapted to handle hay, manure, dirt and the like.

Loader attachments now used on farm tractors are generally satisfactory. However, many of these loaders are generally bulky and heavy and of a construction such that they interfere with the visibility of the tractor operator and/or the stability of the tractor for maneuvering purposes. As a result the over-all efficiency of the tractor is appreciably reduced. Since the loads are usually handled at the front end of the tractor the weight of the attachment plus the weight of the load being carried, oftentimes overloads the small tires on the tractor front wheels, whereby the front tires are flattened so as to make steering difficult, or sometimes are blown out. Further, in many cases, the attachment projects upwardly or laterally of the tractor so that the tractor cannot be stored in its usual storage place. The tractor, therefore, must be left in the weather or the attachment removed. Further, the use of a tractor as a loading machine is only one of the many jobs required of a tractor on a farm. It is thus desirable that the loader attachment be adapted for ready assembly with and removable from the tractor, preferably by one man, to obtain a maximum use of the tractor for its many duties.

It is an object of this invention, therefore, to provide an improved loading machine.

A further object of this invention is to provide a loader attachment for a tractor in which a pair of rock arms, for raising and lowering the lifting arms, and the means for operating the rock arms can be permanently carried on the tractor without interfering in any way with the normal use of the tractor for field work.

Another object of this invention is to provide a loading attachment for a tractor in which a pair of pivoted telescoped lifting arms, on being raised, are initially contracted to cradle a load adjacent the front end of the tractor for load transport purposes, and are then extended to position the load forwardly of the tractor for dumping into a wagon, truck or the like.

Yet another object of this invention is to provide a loader attachment of a construction such that in assembly position on a tractor full visibility in all directions is afforded to the tractor operator.

Still another object of this invention is to provide a loader attachment of a simple and rugged construction, adapted to be easily and quickly

2 assembled with and removed from a tractor by one man, and which is operated with a minimum of effort and with full maneuverability of the tractor.

A feature of this invention is found in the provision of a tractor loader attachment having a pair of pivoted telescoping lifting arms arranged at opposite sides of the tractor, in which the arms are raised and lowered by a pair of rock arms having their free ends movably engageable in supporting positions with the telescoping members of the lifting arms. A link system for each lifting arm is connected with a corresponding rock arm and telescoping member to provide for a movement of the telescoping members in response to the movement of the rock arms.

Still another feature of this invention is found in the provision of a tractor loader attachment having a pair of pivoted lifting arms pivoted at their rear ends on the tractor for up and down pivotal movement, in which the lifting arms are lowered and raised by means including a pair of rock arms arranged at opposite sides of the tractor and having their forward ends in movable supporting engagement with the front ends of the lifting arms. A hydraulic cylinder arranged longitudinally of and below the tractor has a working piston connected with the rock arms to operate the lifting arms.

A further feature of this invention is found in the provision of a tractor loader attachment having a pair of pivoted lifting arms pivoted at their rear ends on the tractor for up and down pivotal movement, in which the arms are lowered and raised by means including a transverse rock shaft having a pair of rock arms arranged at opposite sides of the tractor with their free ends in movable supporting engagement with the front ends of the lifting arms. Rockable movement of the shaft to operate the arms is accomplished by means including a longitudinal drive shaft having its forward end connected with the rock shaft through a worm gear and worm assembly, and its rear end in a driven relation with the rear power takeoff of the tractor.

Another feature of this invention is found in the provision of a tractor loader attachment having a pair of pivoted lifting arms pivoted at their rear ends on the tractor for pivotal up and down movement, and a scoop pivotally supported between their forward ends, in which a latch for releasably engaging a catch on the rear side of the scoop is carried on a transverse rock shaft for rockable movement with the rock shaft. The latch is yieldably moved and held in a catch engaging position by spring means and manually moved out of such engaging position by a manually operated lever pivoted adjacent the rear ends of the lifting arms. The lever is pivotally connected with the rear end of a rod, which has its forward end in a lost motion connection with the free end of a rock arm mounted on the rock shaft, whereby the rock arm is engageable with the rod at all moved positions of the lifting arms to provide for an immediate release of the scoop on actuation of the manual lever, and to reduce any sudden movement of the manual lever on movement of the scoop from a dumping position to a loading position.

Further objects, features and advantages of this invention will become apparent from the following description when taken in connection with the accompanying drawings in which:

Fig. 1 is a side elevational view of the loader attachment of this invention in assembly relation on a tractor of a usual commercial type with certain parts removed to more clearly show such assembly;

Fig. 2 is a sectional detail view taken on the line 2—2 in Fig. 1 showing the construction of a telescoping lifting arm forming part of the loader attachment;

Fig. 3 is a sectional detail view as seen along the line 3—3 of Fig. 1 showing a lost motion connection which forms a part of the mechanism for telescoping the lifting arms;

Fig. 4 is a plan view of the loader and tractor assembly shown in Fig. 1;

Fig. 5 is a fragmentary elevational view of the scoop latching mechanism as seen along the line 5—5 in Fig. 4;

Fig. 6 is a fragmentary sectional detail view of the latch mechanism taken on the line 6—6 in Fig. 4;

Fig. 7 is a sectional detail view of a supporting roller for a lifting arm taken on the line 7—7 in Fig. 4;

Fig. 8 is a sectional view of the brake and hoisting mechanisms for the lifting arms as seen on the line 8—8 in Fig. 4;

Fig. 9 is a sectional view of the hoisting mechanism taken on the line 9—9 in Fig. 4;

Fig. 10 is a sectional detail view of the brake mechanism as seen on line 10—10 in Fig. 8;

Fig. 11 is a longitudinal sectional view of a power transmission unit, forming part of the hoist mechanism, and taken on the line 11—11 in Fig. 4;

Fig. 12 is a longitudinal sectional view of the rock shaft and rocker arm assembly for raising and lowering the lifting arms as seen on line 12—12 in Fig. 4;

Fig. 13 is a sectional view taken on the line 13—13 in Fig. 12;

Fig. 14 is a rear elevational view of the tractor and loader assembly shown in Fig. 1;

Fig. 15 is a side elevational view of a modified form of the loader shown in assembly relation on a tractor;

Fig. 16 is a fragmentary plan view of the hoist mechanism and rocker arm assembly for the attachment shown in Fig. 15 as seen substantially along the line 16—16 in Fig. 15;

Fig. 17 is a sectional view of the hoist mechanism taken on the line 17—17 in Fig. 16;

Fig. 18 is a detail sectional view as seen on line 18—18 in Fig. 16; and

Fig. 19 is a detail elevational view of a lever assembly for controlling the operation of the hoist mechanism shown in Figs. 16, 17 and 18.

With reference to the drawings the loader of this invention is illustrated in Figs. 1 and 4 as assembled on a farm tractor of a usual type having a frame 20, a rear axle 21, a differential housing 22, a rear power take-off 23, rear drive wheels 24 and front steering wheels 26.

The loader includes a pair of telescoping lifting arms 27 and 27a arranged at opposite sides of the tractor. Since each lifting arm 27 and 27a is of a like construction and similarly assembled on the tractor, only one of the lifting arms will be described in detail.

A lifting arm 27 and 27a includes a front telescoping member 28 and a rear member 29, which are of a channel iron construction opening outwardly away from the tractor. As best appears in Fig. 4, the rear end of the arm member 29 is welded to one side of a block 31 which has a rearward extension 32 pivoted on a pin 33 supported in spaced lugs 34 carried on the tractor rear axle 21. Welded on the block member 31, oppositely from the arm member 29, is a guide plate 36 of a length substantially equal to the arm member 29. It is seen, therefore, that the block 31 acts as a spacer between the rear ends of the guide member 36 and the arm member 29.

A spaced relation is maintained over the full lengths of the guide member 36 and arm member 29 by the provision of a pair of like combination supporting and guide units, indicated generally as 37, and longitudinally spaced over the front end portions of the guide member 36 and arm member 29 (Fig. 1). Each unit 37 includes a rectangular frame member 38 (Fig. 2) having one side 39 welded across the open side of an arm member 29 and its opposite side 41 welded across a guide member 36. The ends 42, of a frame member 38, are spaced from the arm member 29 and guide member 36 to accommodate rollers 43, which are arranged at opposite sides of a space 44 formed between an arm member 29 and a guide member 36. The rollers 43 are rotatably supported on shafts 46 carried in the frame side members 39 and 41.

The rollers 43 are in bearing engagement with the opposite sides of a corresponding arm telescoping member 28 which is longitudinally movable within the space 44 relative to a rear arm member 29 and a corresponding guide member 36. Rearward movement of a telescoping member 28 is limited by the engagement of its rear end with the front face of a block member 31, as will appear later. Forward movement of a telescoping member 28 is limited, by means to be hereinafter described, at a position such that the rollers 43, in the pair of units 37 for each lifting arm 27 and 27a, are always in bearing engagement with opposite sides of a telescoping member 28.

Extended between the forward ends of the telescoping members 28 is a transverse connector member 45. A scoop 25, positioned forwardly of the connector member 45, is pivotally supported between the telescoping members on pivot pins 30.

The arms 27 and 27a are raised and lowered by means including a pair of forwardly extended rock arms 47 and 47a (Figs. 4 and 12) arranged at opposite sides of the tractor, and mounted at their rear ends on a rock shaft 48 extended transversely of the tractor at a position rearwardly of the front steering wheels 26. The rock shaft 48 is rotatably supported in bearing members 49 mounted in straps or plate members 51 hung from the tractor frame 20 and secured to the tractor frame by bolts 52. On rockable movement of the shaft 48, the rock arms 47 and 47a are moved in up and down directions at opposite sides of the tractor.

The rock arms 47 and 47a are detachably secured in a like manner to opposite ends of the rock shaft 48 by means including a hub member 53 integrally formed with a flange 54. In the following description only the assembly of the rock arms 47 with the rock shaft 48 will be described in detail. A hub 53 is keyed at 56 on the shaft 48 for rockable movement therewith. The rear end of the rock arm 47 is secured to the flange 54 by bolts 57, and directly to the shaft 48 by a bolt 58 threadable into a threaded axially extended bore formed in the end of the rock shaft 48. It is thus seen that on removal of the bolt 58 the rock arm 47 and the hub member 53 are removable as a unit from the rock shaft 48.

Rotatably supported at the forward ends of the rock arms 47 and 47a, on shafts 72, are rollers 59 (Figs. 4 and 7) adapted for bearing engagement with the under side of a corresponding telescoping member 28. On rockable movement of the rock arms 47 and 47a, the rollers 59 are movable longitudinally of the telescoping members 28 whereby the lifting arms 27 and 27a are raised and lowered in response to the up and down movement of the rock arms. As shown in Fig. 1 the arms 47 and 47a, for a lowered position of the lifting arms 27 and 27a, are inclined forwardly and downwardly from the rock shaft 48 and are movable to upper positions extended forwardly and upwardly from the rock shaft 48.

The telescoping action of the members 28 is accomplished by lever systems including a pair of pivoted levers 61, arranged at opposite sides of the tractor and pivotally supported intermediate their ends on the pins 33 which pivotally support the lifting arms 27 and 27a. Since the lever systems for the lifting arms are of a like construction and similarly assembled with a corresponding lifting arm only the lever system associated with the lifting arm 27 will be described in detail.

A lever 61 (Figs. 1 and 14) is comprised of a pair of spaced arm members 62 connected together at their upper ends by a bolt 63 and having a combination bearing and spacer block 64 pivotally supported at 66 between their lower ends. Pivoted at its rear end on the bolt 63, and between the arm members 62, is an upper rod or link member 67, which has its forward end pivotally connected at 68 with an upright lug 69 on the top side of the telescoping member 28. A lower rod or link member 71 has its forward end pivotally supported on the shaft 72 for the rock arm roller 59, with such forward end being integrally formed with a hook member 73 adapted to extend within the open side of the telescoping member 28 to maintain the roller 59 in an engaging position with the under side of the telescoping member 28 (Fig. 7).

Mounted about the rear end of the lower rod 71 is a tubular sleeve member 74 (Fig. 3) which is loosely extended through the bearing member 64 carried between the lower ends of the arm members 62 of the lever 61. Positioned at opposite sides of the bearing member 64 and mounted about the sleeve member 74 are a pair of coil springs 76, which are arranged in compression between the bearing member 64 and adjusting nuts 77 threadable on the lower rod 71 for bearing engagement with opposite ends of the sleeve member 74. It is seen, therefore, that the rear end of the lower rod 71 is in a lost motion connection with the lower end of the lever 61 for a purpose which will appear later.

In the operation of the lever systems, including the upper rods 67, the lower rods 71 and the levers 61, assume the lifting arms 27 and 27a to be in their lowered position shown in Fig. 1. On rockable movement of the rock arms 47 and 47a in an upward direction the rollers 59 are initially moved longitudinally forwardly on the telescoping members 28 until the lifting arms 27 and 27a and the rock arms 47 and 47a are in substantially horizontal positions as indicated in dotted lines at B in Fig. 1. In response to this initial forward movement of the rollers 59, relative to the telescoping members 28, the lower rods 71 are moved forwardly, whereby the levers 61 are pivotally moved in a counter clockwise direction as viewed in Fig. 1, to their dotted line positions indicated at B' in Fig. 1.

Because of the pivoted connection of the upper rods 67 between the lever 61 and the telescoping member 28, the telescoping members 28 are thus initially moved in a rearward direction toward their contracted positions. As a result of this initial contracting movement of the telescoping members 28 the scoop 25 is moved rearwardly towards the front end of the tractor. Thus for the horizontal position B of the lifting arms 27 and 27a the scoop 25 is closer to the front end of the tractor, relative to its normal ground or loading position.

On a continued movement upwardly of the rock arms 47 and 47a, from their positions providing for a horizontal position of the lifting arms 27 and 27a, the rollers 59 are moved rearwardly on the front telescoping members 28. In response to this rearward movement of the rollers 59 the lower rods 71 are moved in a rearward direction whereby the levers 61 are pivotally moved in a clockwise direction, as viewed in Fig. 1, to their dotted line positions indicated at C' in Fig. 1, corresponding to an elevated dotted line position C for the lifting arms 27 and 27a. As a result of this clockwise pivotal movement of the levers 61 the upper rods 67 are moved forwardly to extend the telescoping members 28.

In the use of the loader the load to be handled is often times picked up at one location and then moved to a second location for dumping which may be an appreciable distance from the load pick-up location. To minimize the swaying action of the carried load on the maneuverability of the tractor it is desirable that the carrying position of the load be as close as possible to the tractor. By reducing the distance between the scoop 25 and the front wheel axle the effective moment arm of the carried load is correspondingly reduced, to in turn reduce the action of the load to raise the rear end of the tractor, or to laterally sway the tractor as the tractor is advanced.

Because of the action of the lever systems 61, 67 and 71, in response to the movement of the rock arms 47 and 47a, the scoop 25 is initially moved inwardly toward the front end of the tractor until the lifting arms 27 and 27a are at their dotted line positions indicated as B in Fig. 1. Since this position is representative of a normal transport position the load is easily carried by the tractor without appreciably reducing its usual stability and maneuverability.

In order to dump the load into a wagon or a truck, sufficient clearance must be provided between the wagon and the tractor. This clearance is accomplished by virtue of the telescoping members 28 being extended forwardly as the lifting arms 27 and 27a are moved from their dotted line positions B to their dotted line positions C, which are indicated in Fig. 1. It is thus seen that the lifting arms 27 and 27a, on being elevated are automatically adjusted by the lever systems 61, 67 and 71, in response to a movement of the rock arms 47 and 47a, to initially position the scoop 25 adjacent to the front end of the tractor for load transport purposes, and to later position the scoop away from the front end of the tractor for dumping.

As was previously described the rear ends of the lower rods 71 are in a lost motion connection with the lower ends of the pivoted levers 61. In a usual bucking operation, for loading the scoop 25, the telescoping members 28 are moved rearwardly to a stopped position against the block members 31 so that the bucking force is applied directly against the tractor rear axle 21, through the pivots 33 and lugs 34. Since the lifting arms 27 and 27a may be in their lowermost positions, or in a partially elevated position during a bucking operation, it is desirable that the telescoping members 28 be always movable to a stop position against the blocks 31 to keep the bucking force from being applied on the lever systems 61, 67 and 71.

By virtue of the lost motion connection of the lower rods 71 with the levers 61 the rearward movement of the telescoping members 28 to their stop positions against the blocks 31 will take place even though the members 28 are initially in a partially extended position. In other words with the members 28 in a partially extended position the levers 61, on the application of a bucking force, will move relative to the lower rods 71 to adjust the lever systems to positions at which the telescoping members 28 will engage the blocks 31. The springs 76 are adapted to hold the lower ends of the levers 61 in substantially fixed positions relative to the lower rods 71 during a lifting operation of the loader. The lost motion connection thus provides for the force of the bucking action being applied directly against the tractor rear axle 21 for a range of moved positions for the lifting arms 27 and 27a to eliminate such force being applied against the lever systems for operating the telescoping members 28.

The rock shaft 48 is operated from the tractor rear power take-off 23 by means including a driven shaft 81 (Figs. 4 and 11) extended longitudinally of the tractor and positioned between the tractor and the lifting arm 27a. The shaft 81 is rotatable within a casing or tube member 82 clamped at its rear end against the under side of the tractor rear axle 21 and terminating at its front end in a gear housing 83, provided with bearing portions 84 through which the rock arm 48 is rotatably extended (Fig. 12). The housing 83 is mounted on the shaft 48 between the bearing 49 and the hub 53 corresponding to the rock arm 47a.

Arranged within the gear casing 83 is a worm gear 86 keyed on the shaft 48 and adapted for meshing engagement with a worm 87 carried at the forward end of the driven shaft 81. Mounted on the rear end of the shaft 81, rearwardly of the tractor rear axle 21, is a double pulley 88 which is connected through V-belts 89 with a double pulley 91 (Figs. 4 and 9) mounted on the rear power take-off shaft 23. The power from the take-off 23 is thus transmitted from the pulley 91 through the belts 89 to the shaft 81, and through the worm assembly 86 and 87 to the rock arm 48.

The double pulley 91 (Fig. 9) is comprised of an intermediate member 92 and end members 93, keyed on the power take-off 23 for axial movement. Spacer members 94 loose on the power take-off shaft 23 are interposed between the intermediate member 92 and each end member 91. Mounted on the free end of the power take-off shaft 23, for rotation therewith, is a stop collar 96. The members 92 and 93 of the double pulley 91, are moved against the spacer members 94, and the pulley 91, as a unit, is moved against the stop collar 96 by a clutch mechanism including a collar member 95 keyed on the power take-off shaft 23 for axial movement in response to the actuation of a clutch lever 97 (Figs. 4, 8 and 14).

The clutch lever 97 is mounted at its lower end on a shaft 98 which is rotatably supported in the rear ends of a pair of bracket members 99 and 99a carried on the tractor rear axle 21 and extended rearwardly therefrom. A rearwardly extended link member 101 is pivoted at its forward end to the lever 97 and at its rear end to one end of a yoke member 103. The opposite or yoke end 105 of the yoke member 103 is slidable, in a usual manner, within an annular groove formed in the collar member 95. The yoke member 103 is pivoted intermediate its ends on a bracket member 104 extended rearwardly from the differential housing 22.

On movement of the lever 97 in a forward direction, the yoke member 103 moves the collar member 95 rearwardly on the power take-off shaft 23 whereby the pulley members 92 and 93 are moved into frictional engagement with the V-belts 89 to connect the pulley 88 in a driven relation with the pulley 91. On movement of the lever 97 in a rearward direction the collar 95 is moved forwardly on the power take-off shaft 23 whereby the belts 89 move the members 93 away from the members 92, and engage the spacer members 94. The belts 89 are thus out of frictional engagement with the pulley members 92 and 93, and in a supported position on the spacers 94 which are loose on the power take-off shaft 23.

To elevate the lifting arms 27 and 27a, therefore, the clutch lever 97 is moved forwardly to provide for the contraction of the pulley 91 to drive the pulley 88, whereby power is transmitted through the shaft 81 and through the gear assembly 87 and 86 to the rock shaft 48. When the lifting arms have been elevated to a desired height the clutch lever 97 is moved rearwardly to provide for an expansion of the pulley 91 to stop the transmission of power to the pulley 88. In order to hold the arms 27 and 27a in an elevated position the pulley 88 is provided with a brake drum 106 (Figs. 8 and 10) having a corresponding brake band 107. The brake band 107 has one end fixed on a bent bolt member 108, secured to the underside of the bracket 99 and its opposite end 115 slidably movable on an upright bolt 109 carried in the top side of the bracket member 99. A spring 111 mounted about the bolt 109 is arranged in compression between the brake band end 115 and a nut 112 for the bolt 109, and acts to normally retain the brake band 107 in frictional engagement with the brake drum 106 to hold the pulley 88 and in turn the shaft 81 against rotation.

A supporting shaft 110 for a cam 113 is carried between the brackets 99 and 99a rearwardly of the lever shaft 98, at a position providing for the selective engagement of the cam 113 with the under side of the brake band end 115, in response to the actuation of the clutch lever 97 (Figs. 8 and 10). A link 120 is pivoted between the clutch lever 97 and the cam 113. When the clutch lever 97 is in one moved position providing for the disengagement of the pulley 91 with the V-belts 89 the cam 113 is in its neutral position, indicated in dotted lines at D in Fig. 10, relative to the brake band 107 whereby the brake band is frictionally held about the brake drum by the spring 111.

On movement of the clutch lever 97 in a forward direction to provide for the frictional engagement of the pulley 91 with the V-belts 89 the high spot 125 on the cam 113 is moved against the brake band end 115 to its full line position shown in Fig. 10, to compress the spring 111 and release the brake band from frictional engagement with the brake drum 106. As a result the pulley 88 and in turn the shaft 81 is freely rotatable. On movement of the clutch lever 97 rearwardly to disengage the pulley 91 from the belts 89 and stop the elevation of the lifting arms 27 and 27a at a desired height the neutral portion of the cam 113 engages the brake band end 115 whereby the brake is set by the action of the spring 111 to hold the shaft 81 against rotation.

In order to lower the lifting arms 27 and 27a the clutch lever 97 is moved rearwardly until the cam high spot 135 engages and moves the brake band end 115 against the action of the spring 111 to release the brake, as indicated in dotted lines at E in Fig. 10. It is thus seen that the lever 97 is common to the clutch mechanism for controlling the transmission of power to the shaft 81, and to the brake mechanism for holding the shaft 81 against rotation when the clutch is in its disengaged position.

The scoop 25 is releasably held in a load carrying position by a latching mechanism including a latch member 116 (Figs. 4, 5 and 6) mounted at the inner end of a rock shaft 117 rockably supported in bearings 118 in a parallel relation with and on the top of the transverse beam member 45. The latch member 116 is of a generally arcuate shape curved upwardly and rearwardly from its supported end on the rock shaft 117 and is formed with an upright elongated opening 119, adjacent its upper end, adapted to receive a catch member 121 extended rearwardly from the back wall of the scoop 25.

In order to hold the latch member 116 in an engaging position with the catch 121 the outer end of the rock shaft 117 carries a bell crank having one arm connected to one end of a tension spring 123. The opposite end of the spring 123 is attached at 124, to the telescoping member 28 of the lifting arm 27. Thus, as viewed in Fig. 5, the spring 123 acts to move the rock shaft 117 in a clockwise direction, whereby the latch 116 is releasably moved to and held in a position for engaging the catch 121 on the scoop 25.

The scoop 25 is released for dumping by means comprising a pivoted actuating lever 126 (Figs. 1 and 14) pivotally supported intermediate its ends on the bolt 63 which is carried at the top of the lever arm 61 corresponding to the lifting arm 27. The upper end of the actuating lever 126 carries an inwardly extended manual grip 127 while its lower end carries an inwardly extended foot pedal 128. A connecting rod 129 is pivoted at its rear end adjacent to the top of the actuating lever 126 and has its front end slidably supported in the second arm 131 of the bell crank which is mounted on the rock shaft 117. A spring 132 (Figs. 1 and 5) is mounted about the forward end of the connecting rod 129 and is maintained in compression between the arm 131 and an adjustable nut 133 threadably mounted on the connecting rod 129 at a position rearwardly of the arm 131. An adjustable stop nut 134 is mounted on the connecting rod 129 forwardly of the arm 131.

To release the scoop 25 the lever 126 is moved in a counter-clockwise direction, as viewed in Fig. 1, by either pulling rearwardly on the manual grip 127, or by pushing forwardly on the foot pedal 128. This movement of the lever 126 provides for the movement of the nut 134 into engagement with the arm 131, and the movement of the arm 131 in a counter-clockwise direction, as also viewed in Fig. 1, whereby the latch 116 is moved rearwardly out of an engaged position with the catch 121. It is apparent, of course, that the scoop release movement of the lever 126 takes place against the action of the spring 123.

The scoop 25 is pivotally supported at an unbalanced position on the lifting arms 27 and 27a so that after being dumped, the scoop is returned to a load carrying position by the action of gravity. In other words, the weight of the load in the scoop 25, located forwardly of the scoop pivotal supports 30, tips the scoop forwardly on release of the latch mechanism. However, after the load has been dumped that portion of the scoop 25, located rearwardly of its pivotal supports 30, is heavier than that portion of the scoop located forwardly of the pivotal supports 30, whereby the scoop is tipped, by the action of gravity, into its load carrying position.

On the return of the scoop 25 to its load carrying position the curved construction of the latch member 116 provides for the catch member 121 riding on the front surface of the latch into its engaged position with the latch at the latch opening 119. Since the latch member 116 is initially moved rearwardly, by the catch member 121, the rock shaft 117 in turn is rocked rearwardly or in a counter-clockwise direction as viewed in Fig. 1. By virtue of the lost motion connection of the connecting rod 129 with the rock arm 131 this counter-clockwise movement of the rock shaft 117 merely results in a compression of the spring 132 against the nut 133, so as to substantially eliminate any quick jerking movements of the actuating lever 126. This lost motion connection also provides for a slidable movement of the connecting rod 129 relative to the rock arm 131, on extension of the lifting arms 27 and 27a, whereby to prevent any dumping of the scoop during its elevation to a dumping position.

In Figs. 15–19, inclusive, there is shown a modified form of the invention which is similar in construction and operation to the form of the invention shown in Fig. 1 except for the utilization of a hydraulic means for actuating the rock shaft 141 and rock arms 142 as contrasted to the operation of the rock arms 47 and 47a in Fig. 1 by a mechanical means. Similar numerals of reference, therefore, will be used in Figs. 15–19, inclusive, to designate like parts illustrated in Figs. 1–14, inclusive.

The rock shaft 141 is rotatably supported in bearings 49 carried in plate members 143 and 143a arranged at opposite sides of the tractor and suspended from the tractor frame 20 rearwardly of the front steering wheels 26. The rock arms 142 are arranged at opposite ends of the rock shaft 141 and are connected for concurrent movement with the rock shaft through the hub members 53 and bolts 54 and 56.

Mounted on the rock shaft 141, between the supporting plates 143 and 143a, is a pair of cam segments 144 (Figs. 17 and 18) integrally formed with hubs 146. The hubs 146 are formed with axial bores of a square shape in cross section, adapted to receive a square central section 147 on the rock shaft 141. The cam segments 144 are maintained in assembly position on the rock shaft 141 by means of a single bolt 148 extended through the cams and adapted to clamp the cam hubs 146 against each other.

Each of the cams 144 is formed with a peripheral groove adapted to receive a cable or chain 149 secured at its ends 151 to the cams and having its central section 152 (Figs. 16, 17, and 18) positioned within a groove formed in a head unit 153 of a piston 154, which is positioned longitudinally between the cam segments 144 and below the rock shaft 141.

The piston 154 is associated with a cylinder 156, extended longitudinally below the tractor frame 20, and mounted at its base end on a supporting rod 157 extended between the side plates 143 and 143a. An oil pump 158, mounted on the base end of the cylinder 156 has a shaft 159 with one end projected through the side plate 143a and carrying a pulley 161 which is connected through a belt 162 with a tractor side or belt pulley 163.

By virtue of the removal of the rock arms 142 from the rock shaft 141, by merely removing the bolt 58, the piston and cylinder assembly, and the rock shaft and cam assembly may be permanently attached to the tractor 20, without interfering in any way with the usual operation of the tractor when it is not being used for loading purposes. As a result after the side plates 143 and 143a, the cylinder 156 and rock shaft 141 are mounted on the tractor it is only necessary to remove the lifting arms 27 and 27a and the rock arms 142 to completely prepare the tractor for its usual farm work. Likewise when the loading attachment is to be used it is only necessary to assemble the rock arms 142 with the rock shaft 141 and mount the lifting arms 27 and 27a on the tractor to prepare the tractor for operation as a loading machine.

In the operation of the rock shaft 141 by the cylinder 156 to move the rock arms 142, and in turn raise and lower the lifting arms 27 and 27a, oil under pressure is applied and released from the piston 154. Thus to raise the lifting arms oil pressure applied on the piston 154 extends the piston to its dotted line position, shown in Fig. 18, the cams 144 are rocked in a counter-clockwise direction, as viewed in Fig. 18, by the cable or chain 149. Since the cams 144 are fixed on the rock shaft 141, the shaft is likewise rocked in a counter-clockwise direction as also viewed in Fig. 18, so that the rock arms 142 are moved upwardly to raise the lifting arms 27 and 27a. In lowering the lifting arms oil pressure is released from the piston 154 whereby the rock shaft 141 is rocked in a clockwise direction, as viewed in Fig. 18, and the piston 154 is moved to its contracted position within the cylinder 156, by the weight of the scoop 25 and the lifting arms 27 and 27a.

The application of an oil pressure on the piston 154 is controlled by a valve unit 166 carried adjacent the base end of the cylinder 156 and including an actuating lever 165 which is pivoted at one end to a rod member 167, the opposite end 168 of which is extended outwardly from the plate member 143 (Fig. 16). The rod end 168 is pivotally connected to the free end of a support 169 pivoted at 171 to the side plate 143. A second connecting rod 172 (Fig. 15) extends longitudinally of the tractor and has its forward end pivoted to the free end of the pivoted support 169 and its rear end pivoted at 173 to a control lever 174, which is rotatably supported on a shaft 176 extended laterally from the tractor differential housing 22.

The lever 174 (Fig. 19) is releasably held in a moved position by means including a ring member 177 positioned about the shaft 176 and secured to the differential housing 22. A second ring member 178 positioned about the shaft 176 is fixed to the lever 174 for movement therewith. The adjacent side faces of the rings 177 and 178 are formed with radial grooves or serrations 179 adapted for mating engagement, with this engagement being releasably maintained by the provision of a coil spring 181 mounted about the shaft 176 and arranged in compression between the lever 174 and a stop collar 182. Thus on movement of the lever 174 the serrations are moved out of mating positions against the action of the spring 181, which spring, when the lever 174 is in a moved position, releasably holds the lever against movement by virtue of the interlocking engagement of the serrations 179.

The operation of the lifting arms 27 and 27a in the modified form shown in Figs. 15–19, inclusive, is similar in all respects to the operation of the like arms in Fig. 1, so that a further description of such operation is believed to be unnecessary.

From a consideration of the above description it is seen that the invention provides a loading machine which is of a simple and compact construction, and adapted in operation to provide for a load transfer position of the scoop adjacent to the front end of the tractor, and for a dumping position of the scoop located forwardly of the tractor. This operation is accomplished by the provision of the telescoping lifting arms 27 and 27a and their movement to raised and lowered positions by a pair of rock arms arranged at opposite sides of the tractor for up and down movement, and having their free ends in movable bearing engagement with the undersides of the telescoping members of the lifting arms. Since the free ends of the rock arms are moved longitudinally of the lifting arms, during their raising and lowering movements, lever systems assembled with the lifting arms and the rock arms are adapted to actuate the telescoping members in response to a movement of the rock arms.

By virtue of the rollers 59, at the free ends of the rock arms, being engageable with the under sides of the telescoping members of the lifting arms, the lifting arms 27 and 27a are rigidly supported at any moved position against lateral movement relative to the tractor so that a maximum stability of the tractor is accomplished for any moved position of the lifting arms.

Although the invention has been described with respect to several embodiments thereof it is to be understood that it is not to be so limited and that changes and modifications can be made therein which are within the full intended scope of this invention as defined by the appended claims.

I claim:

1. A loading machine including a portable frame, and a pair of pivoted telescoped lifting arms arranged on opposite sides of said frame, means pivotally supporting the rear ends of said arms on said frame, telescoping members for said lifting arms movable forwardly of said frame, a load carrying unit supported between the front ends of said telescoping members, means for raising and lowering said lifting arms including a transverse rock shaft mounted on said frame, a pair of rock arms on said shaft, arranged at opposite sides of said frame and extended forwardly from said rock shaft for up and down movement in a vertical plane, with the free ends of said rock arms being adapted to movably support the telescoping members thereon, means for rocking said shaft, a pair of upright levers pivoted intermediate their ends on said frame adjacent to the rear ends of said lifting arms for pivotal movement longitudinally of said frame, first rods connected between said telescoping members and the upper ends of said levers, second rods connected between the free ends of said rock arms and the lower ends of said levers, with said first and second rods and said pivoted levers acting to extend and contract the telescoping members in response to the movement of said rock arms.

2. A loading machine comprising a portable frame, a pair of pivoted telescoped lifting arms arranged at opposite sides of said frame, means pivotally supporting the rear ends of said arms on said frame, said arms including telescoping members movable forwardly of said frame, a load carrying means supported between the front ends of said telescoping members, means for raising and lowering said lifting arms including a transverse rock shaft mounted on said frame, a pair of rock arms mounted on said shaft and extended forwardly from said shaft, said rock arms being arranged at opposite sides of said tractor for up and down movement, with the free ends of said rock arms being adapted to movably support said telescoping members, means for rocking said shaft, means for moving said telescoping members in response to the movement of said rock arms including a pair of upright levers pivoted in a transversely spaced relation on said portable frame rearwardly of said rock shaft, first connections between one of the ends of said levers and said telescoping members, and second connections between the opposite ends of said levers and said rock arms.

3. A loading machine comprising a portable frame, a pair of pivoted telescoped lifting arms arranged at opposite sides of said frame and pivoted at their rear ends on said frame, telescoping members for said lifting arms movable forwardly of said frame, a load carrying unit supported between the front ends of said telescoping members, means for raising and lowering said lifting arms including a pair of rock arms arranged at opposite sides of said frame for rockable up and down movement in a vertical plane, and having their free ends adapted to movably support said telescoping members, means for concurrently moving said rock arms, means for moving said telescoping members in response to the movement of said rock arms including upright levers pivoted intermediate their ends on said portable frame, and connections between said levers and said telescoping members and rock arms.

4. A loading attachment for a tractor having a rear power take-off shaft, comprising a pair of pivoted lifting arms arranged at opposite sides of the tractor and pivoted adjacent their rear ends on the tractor, means for raising and lowering said lifting arms including a transverse rock shaft carried on said tractor rearwardly of the front end thereof, a pair of rock arms on said rock shaft arranged at opposite sides of said tractor and extended forwardly from said rock shaft, means at the free ends of said rock arms adapted to engage and movably support said lifting arms, means for rocking said rock shaft including a worm gear mounted on said rock shaft, a longitudinal driven shaft supported on said tractor, a worm adjacent the front end of said driven shaft adapted for meshing engagement with said worm gear, and means connecting the rear end of said driven shaft with said rear power take-off shaft.

5. A loading attachment for a tractor having a frame, comprising a pair of pivoted lifting arms arranged at opposite sides of said tractor and pivoted adjacent their rear ends on said frame for up and down pivotal movement, means for raising and lowering said arms including a transverse rock shaft located rearwardly from the front end of said frame, a pair of rock arms mounted on said shaft and arranged at opposite sides of said frame said rock arms being extended forwardly from said rock shaft, means at the free ends of said rock arms adapted to support said lifting arms, a hydraulic cylinder arranged to one side of said rock shaft and extended longitudinally of said frame, a piston for said cylinder, a winding unit mounted on said rock shaft for movement therewith, flexible means having one end windable about said unit, and an opposite end connected with said piston, and means operated by the tractor for supplying fluid under pressure to said cylinder.

6. A loading attachment for a tractor having a front axle, comprising a pair of pivoted lifting arms arranged at opposite sides of the tractor for pivotal up and down movement, a pair of supports arranged at opposite sides of said tractor and suspended from the tractor rearwardly of said front axle, means for raising and lowering said lifting arms including a hydraulic cylinder mounted between said supports and extended longitudinally of the tractor, a piston for said cylinder movable from the front end thereof, a transverse rock shaft mounted between said supports, a cam unit mounted on said rock shaft for movement therewith, flexible means connected at one end to said cam unit, means for connecting the other end of said flexible means with said piston, with said flexible means being wound and unwound from said cam unit, in response to the movement of said piston, to rock said rock shaft, with said cylinder, supports and rock shaft constituting a permanent assembly on said tractor, a pair of rock arms carried on said rock shaft and arranged at opposite sides of said tractor, and means detachably connecting said rock arms on said rock shaft, said rock arms being extended forwardly from said rock shaft with their front ends adapted to support said lifting arms.

7. In a tractor-mounted loader, an extensible lift frame pivoted at one end on the tractor and having an extensible portion extended forwardly of the tractor, a load-supporting unit carried on said free end, a power-operated rock arm rockably supported on the tractor and extended forwardly from its supported end, with the forward end of said rock arm being movably engageable with the lift frame to lower and raise the same, a lever pivoted intermediate its ends on the tractor at a position rearwardly of said rock arm, and connections between the opposite ends of said lever and the forward end of said rock arm and the extensible portion of said lift frame to extend and contract the latter during raising and lowering movements thereof, in response to a movement of said rock arm.

8. In a tractor mounted loader, an extensible lift frame pivoted at one end on the tractor and having an extensible portion extended forwardly of the tractor, a load-supporting unit carried on said free end, a power-operated rock arm rockably supported on the tractor and extended forwardly from its supported end, with the forward end of said rock arm being movably engageable with the lift frame to lower and raise the same, a lever pivoted intermediate its ends on the tractor at a position rearwardly of said rock arm, connections between the opposite ends of said lever and the forward end of said rock arm and the extensible portion of said lift frame to extend and contract the latter during raising and lowering movements thereof, in response to a movement of said rock arm, with the forward ends of said connections being movable in opposite directions longitudinally of said tractor.

9. In a tractor mounted loader having an extensible pivoted lift frame with its free end located forwardly of the tractor, a load-carrying unit at the free end of said frame, a power operated rock arm movably supported on said tractor, and projected forwardly from its support, with the free end of said rock arm being movably engageable with said lift frame to raise and lower the same, means for extending and contracting said lift frame in response to a movement of said rock arm including a lever pivoted on the tractor rearwardly of said rock arm, and connections between opposite ends of said lever and said frame and the free end of said rock arm, with said frame being initially contracted on upward movement thereof to a substantially horizontal position, and extended on its continued upward movement from said horizontal position.

10. In a tractor mounted loader having an extensible pivoted lift frame with its free end located forwardly of the tractor, a load-carrying unit at the free end of said frame, a power operated rock arm movably supported on said tractor, and projected forwardly from its support, with the free end of said rock arm being movably engageable with said lift frame to raise and lower the same, means for extending and contracting said lift frame in response to a movement of said rock arm including a lever pivoted on the tractor rearwardly of said rock arm, and connections between opposite ends of said lever and said frame and the free end of said rock arm, with the connection between said lift frame and lever being movable rearwardly on initial elevation of said lift frame to a predetermined height to contract the same, and forwardly on a continued elevation of the lift frame to extend the same.

11. In a tractor mounted loader having an extensible lift frame pivoted at its rear end on the tractor, a load supporting unit carried at the free end of said lift frame, a rock arm fulcrumed on said tractor projected forwardly from its fulcrum and having its free end movably engageable with the forward end of said lift frame to raise and lower same, means for extending and contracting said lift frame including an upright lever pivoted on the tractor rearwardly of said rock arm, a first connection between the lower end of said lever and the free end of said rock arm, a second connection between the upper end of said lever and said lift frame, with said connections being movable in opposite directions on initial upward movement of said rock arm to a substantially horizontal position, to contract said lift frame, and movable reversely in opposite directions on a continued upward movement of said rock arm to extend said lift frame.

ERIC M. McELHINNEY.

REFERENCES CITED

The following references are of record in the file of this patent:

UNITED STATES PATENTS

| Number | Name | Date |
| --- | --- | --- |
| 2,286,947 | Bankson | June 16, 1942 |
| 2,287,375 | Ford | June 23, 1942 |
| 2,371,273 | Walker | Mar. 13, 1945 |
| 2,402,064 | Markel | June 11, 1946 |
| 2,404,820 | Wuertz et al. | July 30, 1946 |
| 2,421,566 | Kober | June 3, 1947 |
| 2,433,086 | Borgelt | Dec. 23, 1947 |